United States Patent Office 3,493,628
Patented Feb. 3, 1970

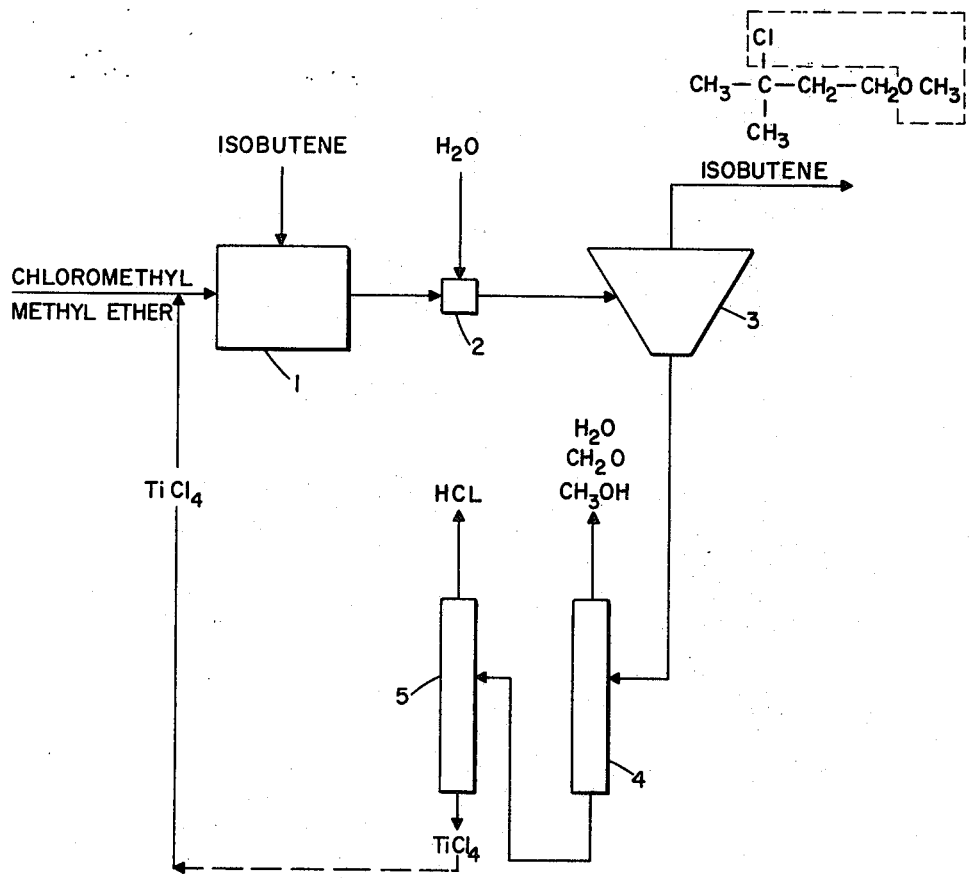

3,493,628
RECOVERY AND RECYCLE OF TiCl₄ IN PROCESSES FOR THE REACTION OF HALOETHERS WITH OLEFINS
John R. Coleman, Jr., Littleton, Colo., assignor to Marathon Oil Company, Findlay, Ohio, a corporation of Ohio
Filed Aug. 17, 1967, Ser. No. 661,457
Int. Cl. C07c 1/20
U.S. Cl. 260—681   9 Claims

ABSTRACT OF THE DISCLOSURE

The present invention comprises a process for preparing the haloether adducts of olefins comprising in combination the steps of reacting a haloether with a reactive olefin in the presence of titanium tetrachloride at a temperature of about −30 to about 70 degrees C. to form a haloether adduct to the olefin in a product mixture together with unreacted haloether and titanium tetrachloride, thereafter adding water to said product mixture and thereafter separating off an aqueous phase which contains substantially all said titanium tetrachloride in said product mixture, and recovering said titanium tetrachloride from said aqueous phase.

CROSS REFERENCES

Some of the reactions disclosed herein are taught by U.S. application 458,432 filed May 24, 1965, by David W. Hall and Ed Hurley, Jr., now Patent 3,360,583, and assigned to the assignee of the present invention. The techniques of that application are, in general, applicable to the processes of the present invention and that application is hereby incorporated by reference into the present application.

BACKGROUND OF THE INVENTION

Certain aspects of the present invention relate specifically to new processes which permit the reaction of haloethers with olefins to form adducts, which adducts can be further reacted to form valuable polyolefinic compounds.

German Patents 647,192 issued July 12, 1937, and 671,063 issued Jan. 31, 1939, teach the formation of 3-chloro-3-methylbutyl methyl ether from chloromethyl methyl ether and isobutene. Japanese patent Showa 39/3,414, issued Apr. 2, 1964, teaches the reaction of acetals with olefins at high temperatures to obtain olefinic ethers which are then cleaved to form conjugated diolefin. Dehydrohalogenation to form olefins is well known to the chemical industry. So far as I am aware, no previous process has taught the unexpected and economically important catalyst recovery of the present invention.

SUMMARY OF THE INVENTION

The above mentioned United States application of Hall and Hurley teaches a process which comprises reacting an alpha-haloether with an olefin to form a haloether adduct of the olefin. By splitting alcohol and hydrogen-halide from the haloether adduct a conjugated polyolefin is formed. Such polyolefins, e.g. isoprene, are valuable for a wide variety of purposes, including use as chemical intermediates and the production of polymers. During the initial step, the reaction of the haloether with the olefin, a Friedel-Crafts catalyst is preferably used and for this purpose titanium tetrachloride is most preferred. The preesnt invention embodies the discovery that the simple addition of water to the product mixture resulting from the reaction of haloethers with olefins (which product mixture comprises unreacted haloethers, the adduct, and titanium tetrachloride catalyst and usually some unreacted olefin) in the product mixture separates into an organic and an aqueous phase. The organic phase contains the adduct and any unreacted olefin. The aqueous phase contains substantially all of the titanium tetrachloride, the unreacted haloether together with hydrolysis products thereof and water. Especially surprising is the fact that the titanium tetrachloride is not hydrolyzed to form more than minor quantities of TiO₂ in the aqueous phase. While the present invention is not to be restricted to any particular mechanism under which it may operate, it appears that the titanium tetrachloride may be protected from substantial hydrolysis by the presence of the haloether which itself hydrolyzes in the presence of water to form aldehyde and alcohol together with HCl.

The present invention thus permits the simple separation of the adduct product from the titanium tetrachloride catalyst and the titanium tetrachloride catalyst is readily recovered from the aqueous phase by conventional distillation or other techniques. In most instances, the titanium tetrachloride catalyst will preferably be recycled back to the point at which the haloether and the olefin are reacted.

DESCRIPTION OF THE DRAWING

The drawing illustrates a preferred embodiment of the present invention in which chloromethylether is reacted with isobutylene in the presence of titanium tetrachloride to form the isobutylene adduct of chloromethyl methyl ether.

DESCRIPTION OF THE PREFERRED EMBODIMENTS

Starting materials

A variety of alpha-haloethers are useful in this process. Alpha-monohalo lower alkane ethers, either unsymmetrical or symmetrical, are preferred. Preferably, the haloethers are substituted in the alpha position with chloro, bromo, or iodo and are methyl, ethyl, or propyl ethers. Alpha-haloethers useful in this process include symmetrical haloethers, such as bis(chloromethyl)ether, bis(alpha-bromoethyl)ether, bis(alpha-iodopropyl)ether; unsymmetrical ethers, such as alpha, beta-dichloro diethyl ether, dichloro methyl methyl ether, chloromethyl dodecyl ether, chloromethyl p-chlorophenyl ether, alpha-bromomethyl ethyl ether, alpha-iodomethyl propyl ether, chloromethyl phenyl ether, etc.; and cyclic ethers, such as 2,5 - dichlorotetrahydrofuran, alpha - phenyl - alpha-chloromethyl pyrocatechol, 2,3 - dichlorotetrahydropyran, etc.; and mono-chloroethylene carbonate.

Reactive olefins useful in this process are those which are not spatially or sterically prevented from reacting with a desired haloether under a given set of reaction conditions. Useful olefins include the halogen-substituted olefins, preferably mono-halogen atom substituted on an olefinic carbon atom. Additional halogen atoms can be present on other carbon atoms; aromatic hydrocarbon-substituted olefins; and saturated aliphatic-substituted olefins as well as the unsubstituted hydrocarbon olefins. Examples of such olefins include allylchloride; allylbromine; 3-methyl-3-butenyl methyl ether; 2-fluoropropene; butadiene; isoprene; 2-chloropropene; cyclohexene; styrene; p-chlorostyrene; ethylene; 2-butene; propylene; 3-methyl-butene; 1-pentene; 2-pentene; 2-methyl-2-butene; 1,3-pentadiene; 2,3-dimethyl-1,3-butadiene; 2,3-dimethyl-2-butene; 1,3-cyclohexadiene; 2,4-hexadiene; 1-octene; cyclohexylethylene; allylbenzene; etc. Preferably, the olefins used as raw materials in this process have 2–9 carbon atoms.

The haloether adduct preparation is preferably accomplished in the liquid phase. A gaseous olefin can be sparged through a liquid ether or a solid ether in solution in an inert solvent. Alternately, the reactants can be run countercurrent through a column packed with catalyst in a continuous process. Generally, the reaction goes well at room temperatures. A preferred temperature range is from about −30 to about 70 degrees C., and a more preferred range is from about 5 to about 35 degrees C. Generally, a solvent is not required in the haloether adduct formation though, where necessary, solvents such as chloroalkanes—for example, carbon tetrachloride and dichloro ethane—and alkane ethers such as diethyl ether can be utilized for solid olefins or haloethers where sufficient heat to melt the solids is not available or the required heat is uneconomic.

Haloethers and olefins, preferably containing from 2 to about 20, more preferably from 2 to about 10, and most preferably from 2 to about 6 carbon atoms will in most cases, be utilized in the present invention.

In general, the addition reactions between the haloether and the olefin will be conducted at a temperature of from about −30 to about 70, more preferably from about 5 to about 35, and most preferably from about 25 to about 30 degrees C. Pressure is not critical and may range from about 0.1 to about 10,000, more preferably from 0.5 to about 1,000 p.s.i.a., and most preferably will be approximately atmospheric. The reaction may be run on a batch basis, but a continuous basis will, in most cases, be preferred. Most ratios are not narrowly critical, but it is important that at least some haloether remain unreacted prior to the addition of water to the product mixture. The amount of water added to the product mixture will, in most cases, be from 1% to about 50%, more preferably 3% to about 15%, and most preferably 5% to about 10% (based on the total weight of the product mixture) over that stoichiometrically required to hydrolize the haloether remaining in the product mixture.

Separation of the aqueous from the organic phases is readily accomplished by decantation or by centrifugation or other conventional means. Distillation will preferably be employed to recover the titanium tetrachloride from the other components of the aqueous phase, i.e. water, and unreacted haloether and its hydrolysis products, but other methods of separation may be utilized. Distillation should be accomplished with temperatures of at least 136.4° C. at one atmosphere of pressure.

The titanium tetrachloride will, in most cases, be recycled back to the point of reaction between the haloether and the olefin. In most cases, it will be preferable to have from about ¼ weight percent to about 10 weight percent, more preferably from about ½ to about 6, and most preferably from 1 to about 3 moles of titanium tetrachloride for each mole of haloether present in the reaction mixture.

In an especially preferred embodiment of the present invention, chloromethyl methylether (12,710 pounds per hour) and titanium tetrachloride (64 pounds per hour) are mixed together and fed to a reactor 1 to which isobutene (9,845 pounds per hour) is added. The reactor operates at a temperature of approximately 70 degrees F. and at approximately atmospheric pressure. The product stream from the reactor is fed to a mixer 2 where it is mixed with water (2,544 pounds per hour). The resulting mixture is then fed to a continuous settler 3 which separates an aqueous phase containing water, titanium tetrachloride, and hydrochloric acid, formaldehyde, and methanol (the latter three being formed from the hydrolysis of unreacted chloromethyl methylether). The second phase herein called the "Organic Phase" contains principally the adduct chloromethylbutylmethylether together with some unreacted isobutene. This Organic Phase may be cleaved according to the methods of 458,432 in order to split off the —Cl and the —OCH₃ groups enclosed by the dotted line in the drawing.

The aqueous phase is then fed to distilling column 4 where water, methanol and formaldehyde are taken off overhead for further separation and recovery. The bottoms from distilling column 4 are sent to distilling column 5 where HCl is taken off overhead and the bottoms is substantially pure titanium tetrachloride. This titanium tetrachloride may then be recycled back to the process as shown by the dotted line in the drawing.

A reading of the present specification will make obvious to those skilled in the art a number of modifications and variations, all of which will be taken as being included in the spirit of the claims appended hereto.

What is claimed is:

1. A process for preparing the haloether adducts of olefins comprising in combination the steps of reacting haloether with reactive olefin in the presence of titanium tetrachloride at a temperature of about −30 to about 70 degrees C. to form a haloether adduct to the olefin in a product mixture together with unreacted haloether and titanium tetrachloride, thereafter adding water to said product mixture and thereafter separating off an aqueous phase which contains substantially all said titanium tetrachloride in said product mixture, and recovering said titanium tetrachloride from said aqueous phase.

2. The process of claim 1 wherein the amount of water added to said product mixture exceeds the stoichiometric amount necessary to hydrolize the hydrolizable components of the product mixture by an amount equivalent to from about 0.1 to 50% water based on the weight of the total product mixture.

3. The process of claim 1 wherein the remaining portion of the product mixture after removal of the aqueous phase is heated to a temperature of from about 50 to about 500 degrees C. to split off hydrogen halide and an alcohol from the haloether adduct and to form a polyene, and wherein the hydrogen halide is thereafter separated from said polyene.

4. The process of claim 1 wherein the haloether is a chloroalkyl ether containing from about 2 to about 6 carbon atoms.

5. The process of claim 1 wherein the haloether comprises a major portion of chloromethyl methyl ether.

6. The process of claim 1 wherein the olefin is an isobutene.

7. The process of claim 1 wherein the titanium tetrachloride recovered is recycled back to a point in the process prior to the reaction of the haloether and the olefin.

8. The process of claim 5 wherein the olefin is an isobutene.

9. The process of claim 8 wherein the titanium tetrachloride recovered is recycled back to a point in the process prior to the reaction of the haloether and the olefin.

References Cited

UNITED STATES PATENTS 2,836,547   5/1958   Stoddard et al. _____ 203—47 X
3,360,583   12/1967   Hall et al. _____ 260—681

DELBERT E. GANTZ, Primary Examiner

G. E. SCHMITKONS, Assistant Examiner

U.S. Cl. X.R.

23—87; 203—29, 71

PO-1050
(5/69)

UNITED STATES PATENT OFFICE
CERTIFICATE OF CORRECTION

Patent No. 3,493,628            Dated Feb. 3, 1970

Inventor(s)   J. R. Coleman, Jr.

It is certified that error appears in the above-identified patent and that said Letters Patent are hereby corrected as shown below:

Col. 1, line 68 - "preesnt" should read --present--

Col. 2, line 60 - "allylbromine" should read --allylbromide--

Col. 3, line 27 - "Most" should read --mole--

SIGNED AND
SEALED
JUN 30 1970

(SEAL)
Attest:

Edward M. Fletcher, Jr.
Attesting Officer

WILLIAM E. SCHUYLER, JR.
Commissioner of Patents